(12) United States Patent
Cordes et al.

(10) Patent No.: US 8,068,691 B2
(45) Date of Patent: Nov. 29, 2011

(54) SPARKLE PROCESSING

(75) Inventors: Claus Nico Cordes, Eindhoven (NL);
Michiel Adriaanszoon Klompenhouwer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 990 days.

(21) Appl. No.: 11/814,502

(22) PCT Filed: Jan. 20, 2006

(86) PCT No.: PCT/IB2006/050219
§ 371 (c)(1),
(2), (4) Date: Jul. 23, 2007

(87) PCT Pub. No.: WO2006/079955
PCT Pub. Date: Aug. 3, 2006

(65) Prior Publication Data
US 2009/0290815 A1    Nov. 26, 2009

(30) Foreign Application Priority Data
Jan. 26, 2005    (EP) .................................. 05100491

(51) Int. Cl.
*G06K 9/40* (2006.01)
(52) U.S. Cl. ........................................ 382/274; 382/263
(58) Field of Classification Search .................. 382/263, 382/274
See application file for complete search history.

(56) References Cited

U.S. PATENT DOCUMENTS

| | | | | |
|---|---|---|---|---|
| 4,091,414 A | * | 5/1978 | Chow | 348/678 |
| 5,012,333 A | * | 4/1991 | Lee et al. | 358/520 |
| 6,081,302 A | * | 6/2000 | Hanai | 348/630 |
| 6,100,941 A | | 8/2000 | Dimitrova et al. | |
| 6,285,798 B1 | * | 9/2001 | Lee | 382/260 |
| 6,313,883 B1 | * | 11/2001 | Thaler | 348/630 |
| 6,633,684 B1 | * | 10/2003 | James | 382/274 |
| 6,798,455 B1 | * | 9/2004 | Abe | 348/353 |

(Continued)

FOREIGN PATENT DOCUMENTS

EP    1473925 A2    11/2004

(Continued)

OTHER PUBLICATIONS

Zhang et al: "General and Domain-Specific Techniques for Detecting and Recognized Superimposed Text in Video"; Proc. IEEE ICIP (International Conference on Image Processing), Rochester, NY, USA, Sep. 2002.

(Continued)

*Primary Examiner* — Brian Werner
*Assistant Examiner* — Utpal Shah

(57) ABSTRACT

An image conversion unit (100) for converting an input image (602) into an output image (606) is disclosed. The image conversion unit (100) comprises: a filter (104) for selecting a group of connected input pixels from the input image (602), the group of connected input pixels having a size which is relatively small relative to the size of the input image (602), the input pixels of the group of connected input pixels having high luminance values relative to the range of input luminance values; and a pixel processor (104) for assigning luminance values to output pixels of the output image (606) on basis of the respective luminance values of the input pixels of the input image (602), whereby the luminance values of the output pixels corresponding to the group of connected input pixels are higher than the respective luminance values of the connected input pixels.

13 Claims, 8 Drawing Sheets

U.S. PATENT DOCUMENTS

Figure 1A:
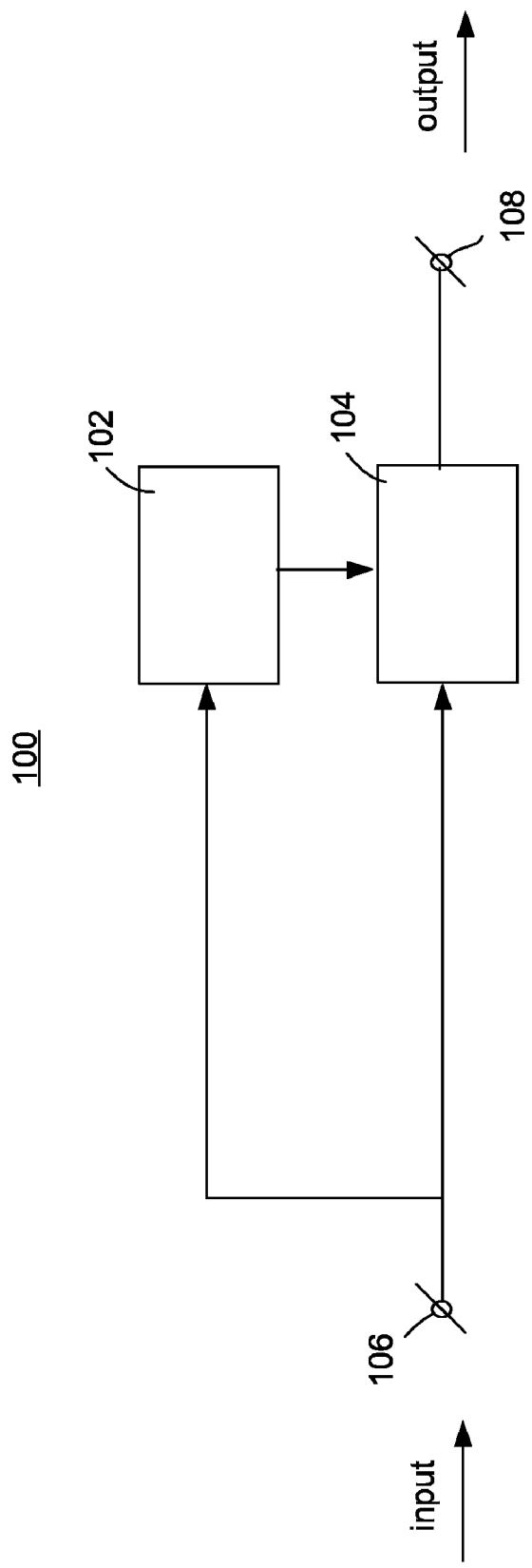

| | | | |
|---|---|---|---|
| 7,106,342 B2 * | 9/2006 | Yoon et al. | 345/589 |
| 7,106,352 B2 * | 9/2006 | Deering | 345/694 |
| 7,358,988 B1 * | 4/2008 | Konishi et al. | 348/222.1 |
| 7,489,814 B2 * | 2/2009 | Spitzer et al. | 382/167 |
| 7,545,443 B2 * | 6/2009 | Miura | 348/678 |
| 7,613,338 B2 * | 11/2009 | Yano | 382/162 |
| 7,787,709 B2 * | 8/2010 | Srinivasa | 382/299 |
| 7,791,656 B2 * | 9/2010 | Katagiri et al. | 348/254 |
| 2003/0091237 A1 | 5/2003 | Cohen-Solal et al. | |
| 2003/0128872 A1 | 7/2003 | Lee et al. | |

FOREIGN PATENT DOCUMENTS

| | | |
|---|---|---|
| WO | WO0013407 A1 | 3/2000 |
| WO | WO2004049293 A1 | 6/2004 |
| WO | WO2004088625 A1 | 10/2004 |

OTHER PUBLICATIONS

Van Der Vaart et al: "Towards Large-Area Full-Colir Active-Matrix Printed Polymer OLED Television"; SID 2004 Digest, pp. 1284, 2004.

* cited by examiner

SPARKLE PROCESSING

The invention relates to an image conversion unit for converting an input image into an output image.

The invention further relates to an image processing apparatus, comprising:
  receiving means for receiving an input image; and
  an image conversion unit for converting the input image into an output image.

The invention further relates to a method of converting an input image into an output image.

The invention further relates to a computer program product to be loaded by a computer arrangement, comprising instructions to convert an input image into an output image, the computer arrangement comprising processing means and a memory.

The range of luminance values in natural scenes can be extremely high. Typically, a camera when acquiring images for later portrayal on a display device applies contrast reduction. This contrast reduction is also called dynamic range compression and typically consists of a combination of (non-)linear scaling and clipping. Very often this results in a relatively strong compression of the bright areas, i.e. regions in the image with relatively high luminance values. Consequently, when displaying the acquired (and processed) images on a display device the dynamic range is limited and may even result in non-natural, i.e. artificial representations.

It is an object of the invention to provide an image conversion unit of the kind described in the opening paragraph for enhancement of bright areas.

This object of the invention is achieved in that image conversion unit comprises:
  a filter for selecting a group of connected input pixels from the input image, the group of connected input pixels having a size which is relatively small relative to the size of the input image, the input pixels of the group of connected input pixels having high luminance values relative to the range of input luminance values; and
  a pixel processor for assigning luminance values to output pixels of the output image on basis of the respective luminance values of the input pixels of the input image, whereby the luminance values of the output pixels corresponding to the group of connected input pixels are higher than the respective luminance values of the connected input pixels.

The image conversion unit according to the invention is arranged to enhance highlights. The invention is based on the assumption that highlights are typically restricted to relatively small areas, i.e. regions of the image. For example light sources like car headlights and streetlights but also reflections on shiny objects like jewelry, rims of cars and glasses are relatively bright. Furthermore, it is assumed that the brightness of these highlights is near the maximum of the dynamic range of the input image, i.e. the range of luminance values. On basis of these assumptions the applicant developed the image conversion unit according to the invention. The image conversion unit is arranged to re-create highlights by selectively increasing the brightness, i.e. luminance values of bright areas with limited dimensions. This yields a visual appearance that is frequently referred to as "sparkle".

Preferably, larger bright areas of the input image maintain their original luminance values. Besides that relatively dark areas also maintain their original luminance values.

In an embodiment of the image conversion unit according to the invention, the filter comprises a high-pass filter. For selecting the group of connected input pixels, i.e. the region of the input image of which the luminance values have to be increased, a high-pass filter is suitable. Preferably, the characteristics of the high-pass filter correspond with the dimension of the group of connected input pixels. For a standard definition video input image (720*480 pixels) a suitable kernel size of the high-pass filter is approximately 20*20 pixels. That means that, representations of objects which extend over less than that number of pixels and which have relatively high luminance values are selected for luminance value increase.

An embodiment of the image conversion unit according to the invention, comprises a gain control unit for controlling the pixel processor by means of a gain control signal which is based on the luminance values of the input pixels. Preferably, the increase of luminance values is not constant for all luminance values, but depends on the different luminance values. Preferably, the amount of increase, i.e. the gain is proportional to the input luminance value. Higher input luminance values are increased more.

In an embodiment of the image conversion unit according to the invention, the gain control signal is based on the output of the filter, whereby the actual gain value of the gain control signal is relatively high for a relatively high output value of the filter. Preferably, the increase of luminance values is not constant for all selected pixels. Pixels having luminance values which are relatively high compared to the range of input luminance values and relatively high compared to their neighboring pixels will be affected relatively much by the image conversion unit, i.e. the difference between the luminance values of these input pixels and luminance values of the corresponding output pixels are relatively high.

In an embodiment of the image conversion unit according to the invention, the pixel processor is arranged to determine a particular output luminance value of a particular output pixel on basis of a particular input luminance value of a particular input pixel corresponding to the particular output pixel and on basis of a particular gain value for the particular input pixel. Preferably, the increase of a particular luminance value of a particular pixel is both based on the particular luminance value itself and the luminance value compared to further luminance values of neighboring pixels. Neighboring pixels may be located in region of approximately 30*30 pixels. That means that very small regions in the input image having very high luminance values are enhanced more than regions which are a little bigger and/or have little bit less high luminance values.

An embodiment of the image conversion unit according to the invention is arranged to convert the input pixels with luminance values in the range of input luminance values to respective output pixels with luminance values in the range of output luminance values, whereby the range of output luminance values is bigger than the range of input luminance values.

Another embodiment of the image conversion unit according to the invention is arranged to convert the input pixels with luminance values in the range of input luminance values to respective output pixels with luminance values in the range of output luminance values, whereby the range of output luminance values and the range of input luminance values are mutually substantially equal. Typically, a reduction of the dynamic range for relatively low luminance values is needed in order to create space for extension of the dynamic range for relatively high luminance values.

An embodiment of the image conversion unit according to the invention, further comprises an average luminance computing unit for computing the average luminance value of the input image and for controlling the conversion of luminance values of input pixels into respective luminance values of output pixels. If the average luminance value of the input image is relatively low then the amount of possible increase of luminance values is relatively high. Measuring the average luminance value of the input image is beneficial. The measured or computed average luminance value is preferably applied to adjust the characteristics of the high-pass filter. Alternatively, the average luminance value is applied in the gain control unit or the pixel processor.

It is a further object of the invention to provide an image processing apparatus of the kind described in the opening paragraph for enhancement of bright areas.

This object of the invention is achieved in that image conversion unit comprises:

a filter for selecting a group of connected input pixels from the input image, the group of connected input pixels having a size which is relatively small relative to the size of the input image, the input pixels of the group of connected input pixels having high luminance values relative to the range of input luminance values; and a pixel processor for assigning luminance values to output pixels of the output image on basis of the respective luminance values of the input pixels of the input image, whereby the luminance values of the output pixels corresponding to the group of connected input pixels are higher than the respective luminance values of the connected input pixels.

The image processing apparatus might support one or more of the following types of image processing:

Video compression, i.e. encoding or decoding, e.g. according to the MPEG standard.

De-interlacing: Interlacing is the common video broadcast procedure for transmitting the odd or even numbered image lines alternately. De-interlacing attempts to restore the full vertical resolution, i.e. make odd and even lines available simultaneously for each image;

Image rate conversion: From a series of original input images a larger series of output images is calculated. Output images are temporally located between two original input images; and Temporal noise reduction. This can also involve spatial processing, resulting in spatial-temporal noise reduction.

The image processing apparatus might e.g. be a TV, a set top box, a VCR (Video Cassette Recorder) player, a satellite tuner, a DVD (Digital Versatile Disk) player or recorder or a Hard-disk recorder.

The image processing apparatus may comprise additional components, e.g. a display device for displaying the output image. The display device may be based on any of the set of display technologies comprising LCD, OLED, and PDP. See for OLED e.g. the article "Towards Large-Area Full-Color Active-Matrix Printed Polymer OLED Television", by N. C. van der Vaart et al, in SID 2004 Digest, pp. 1284, 2004".

Preferably, the display device is based on a multi-primary technology, i.e. more than three color components, e.g. RGBW or RGBY. See for RGBW e.g. the background section of US20030128872. Typically, display devices like OLED are limited in the average brightness rather than their peak brightness. This is because of constraints related to lifetime, power consumption or color saturation. By applying the image conversion unit according to the invention, one can benefit from the very high peak brightness capabilities of displays while avoiding a significant increase of average luminance.

Furthermore, the obtained dynamic range content can be used to exploit the additional luminance headroom of RGBW display devices, i.e. display devices having an additional white primary next to the existing RGB (Red Green Blue) primaries. The gamut of these display devices is such that it is not always possible to use available luminance without creating artifacts. Therefore, the image conversion unit according to the invention can use any remaining headroom.

It is a further object of the invention to provide a method of the kind described in the opening paragraph for enhancement of bright areas.

This object of the invention is achieved in that the method comprises:

selecting a group of connected input pixels from the input image, the group of connected input pixels having a size which is relatively small relative to the size of the input image, the input pixels of the group of connected input pixels having high luminance values relative to the range of input luminance values; and assigning luminance values to output pixels of the output image on basis of the respective luminance values of the input pixels of the input image, whereby the luminance values of the output pixels corresponding to the group of connected input pixels are higher than the respective luminance values of the connected input pixels.

It is a further object of the invention to provide a computer program product of the kind described in the opening paragraph for enhancement of bright areas.

This object of the invention is achieved in that the computer program product, after being loaded, provides said processing means with the capability to carry out:

selecting a group of connected input pixels from the input image, the group of connected input pixels having a size which is relatively small relative to the size of the input image, the input pixels of the group of connected input pixels having high luminance values relative to the range of input luminance values; and assigning luminance values to output pixels of the output image on basis of the respective luminance values of the input pixels of the input image, whereby the luminance values of the output pixels corresponding to the group of connected input pixels are higher than the respective luminance values of the connected input pixels.

Modifications of the image conversion unit and variations thereof may correspond to modifications and variations thereof of the image processing apparatus, the method and the computer program product, being described.

Figure 1B:
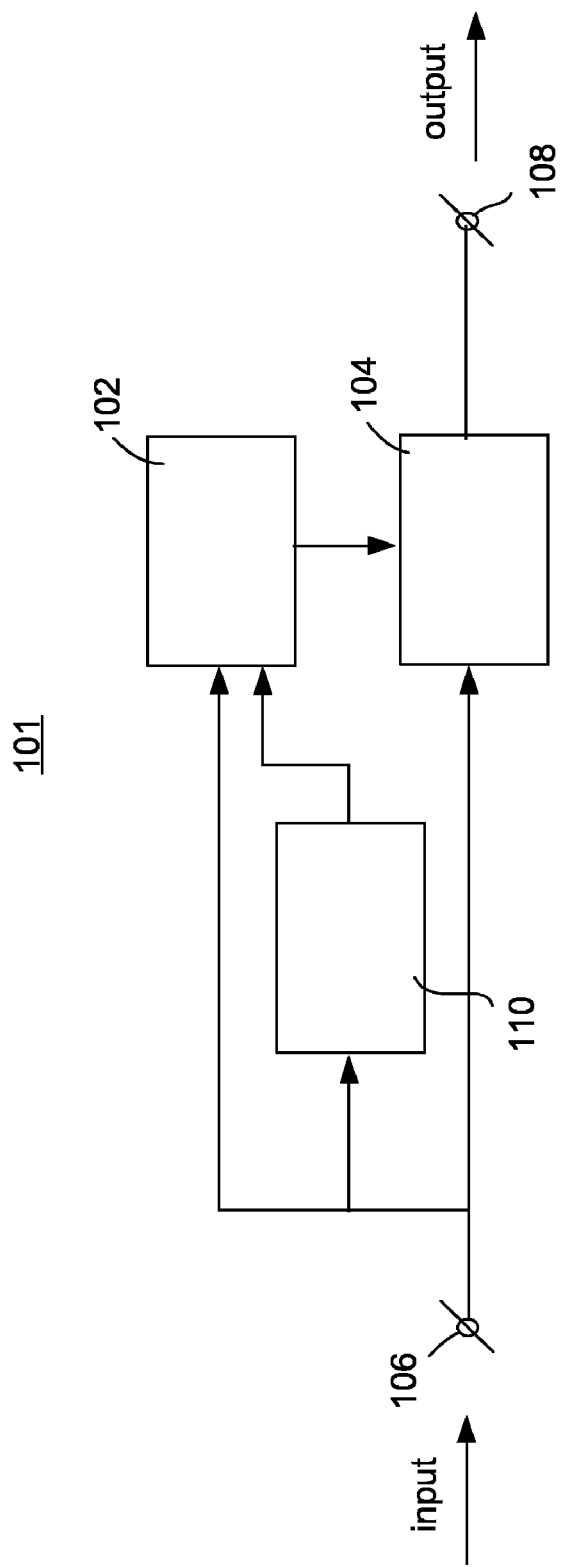
Figure 1C:
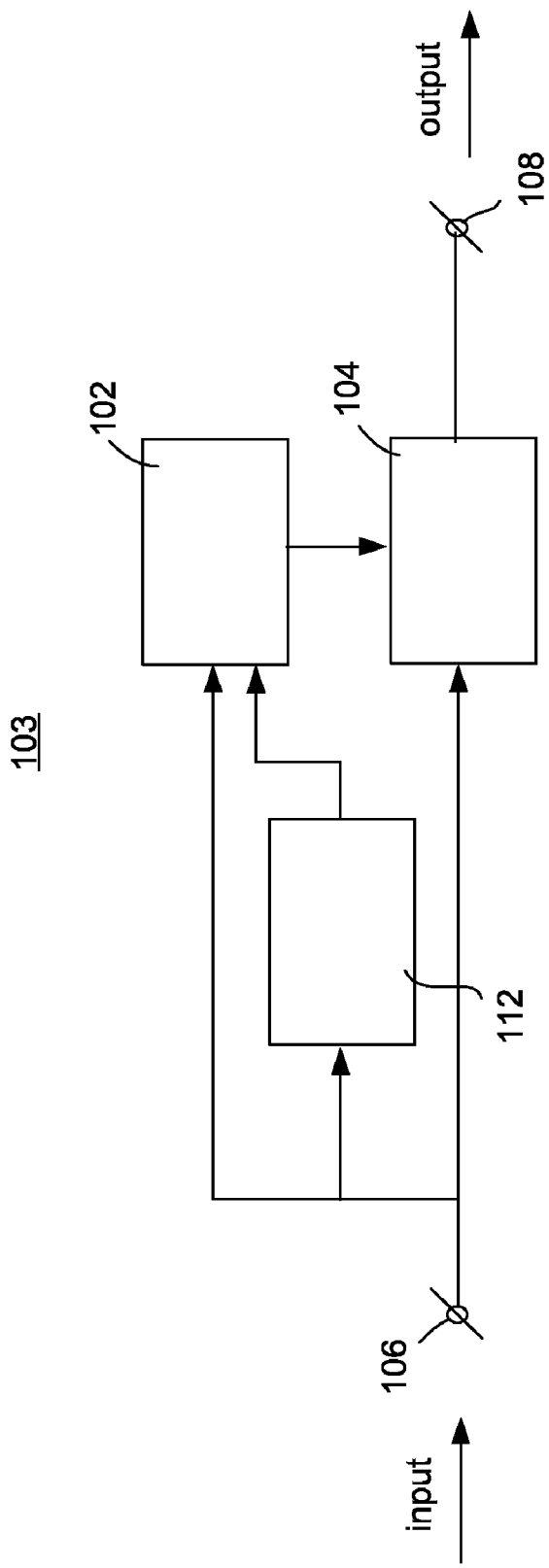
Figure 2:
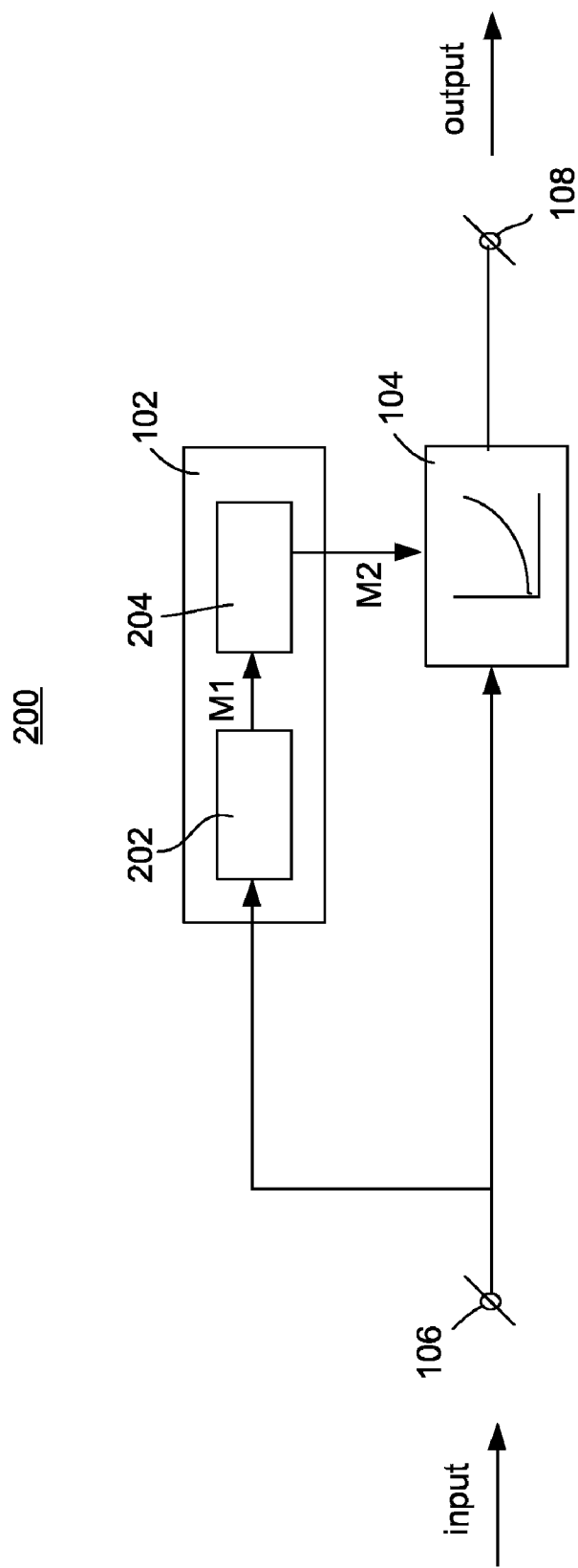
Figure 3:
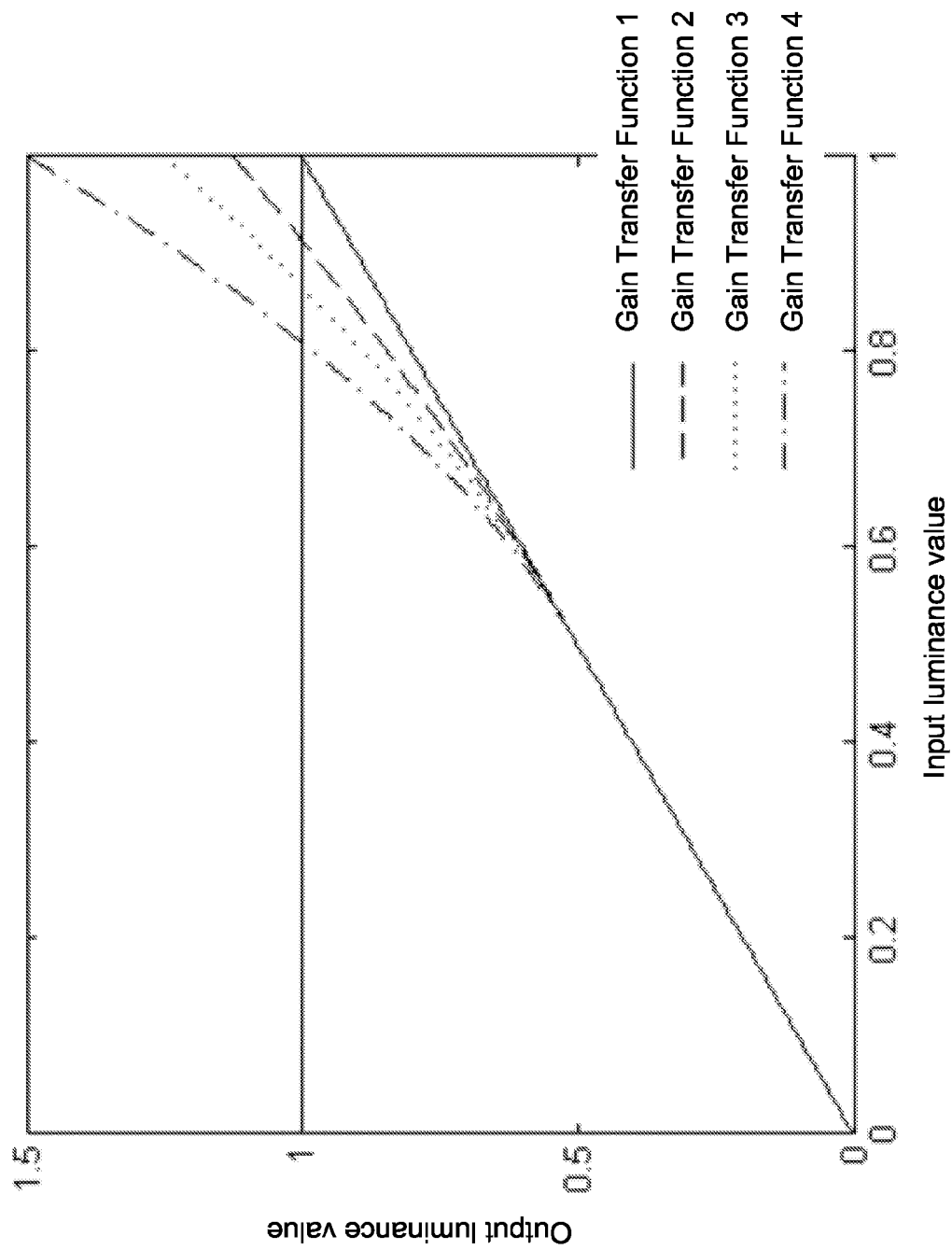
Figure 4:
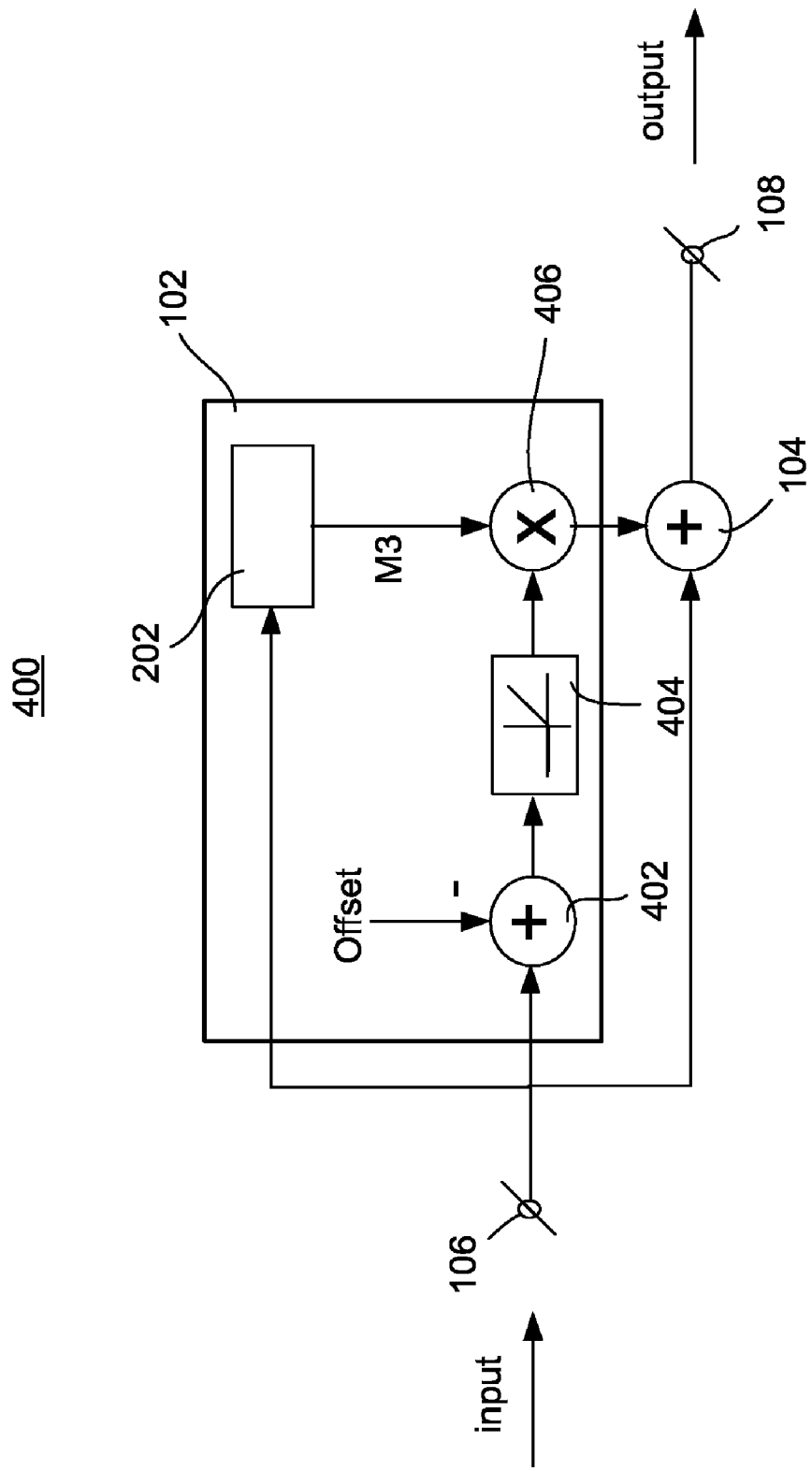
Figure 5:
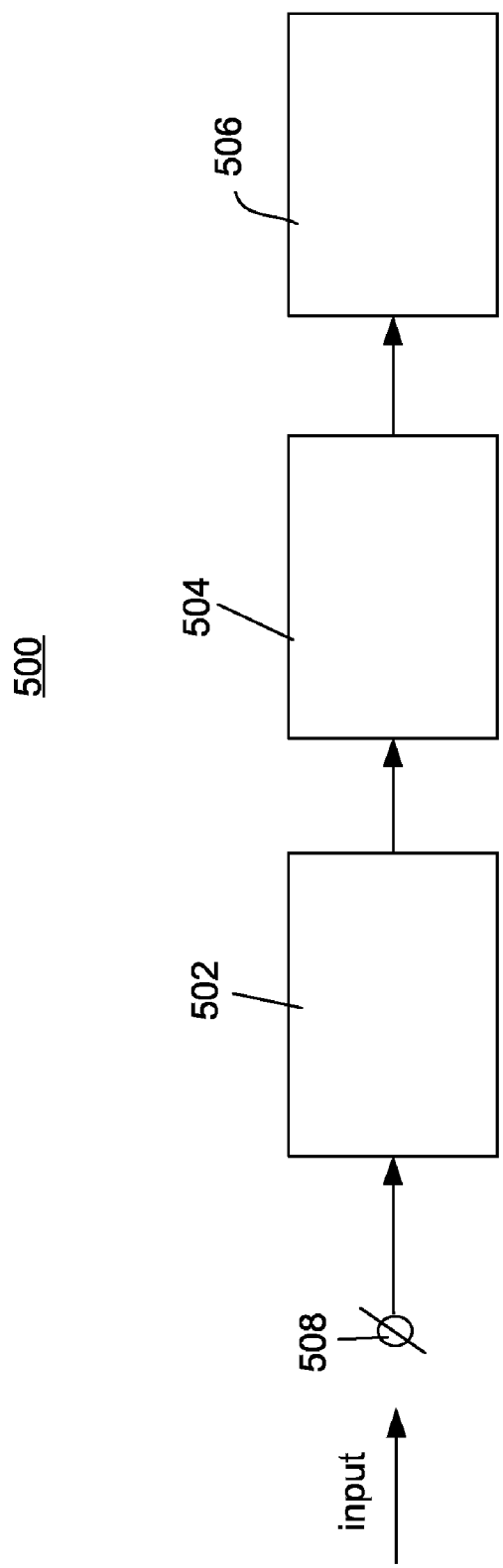
Figure 6:
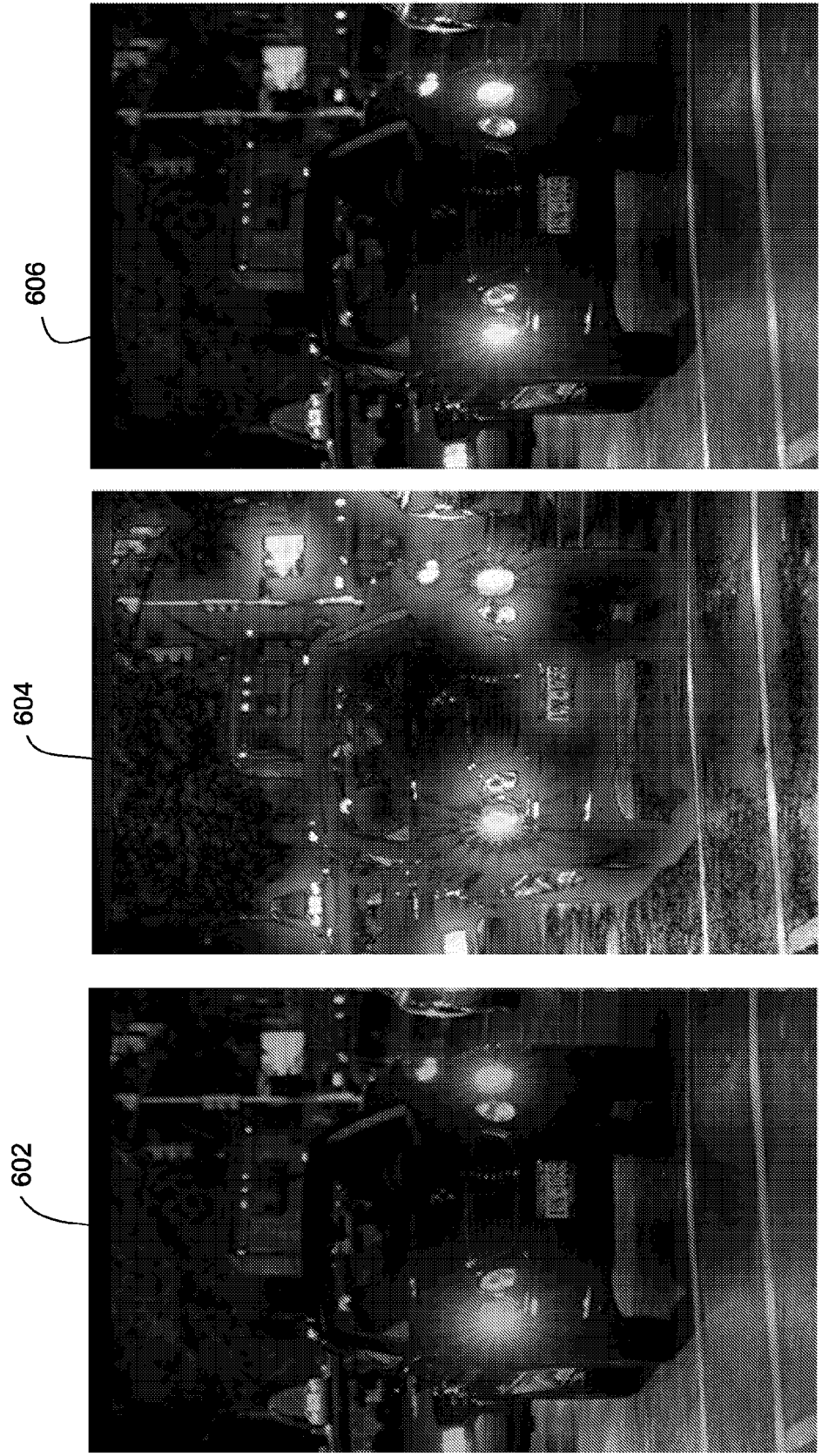

These and other aspects of the image conversion unit, of the image processing apparatus, of the method and of the computer program product, according to the invention will become apparent from and will be elucidated with respect to the implementations and embodiments described hereinafter and with reference to the accompanying drawings, wherein:

FIG. 1A schematically shows an embodiment of the image conversion unit according to the invention;

FIG. 1B schematically shows an embodiment of the image conversion unit according to the invention, comprising an average luminance computing unit;

FIG. 1C schematically shows an embodiment of the image conversion unit according to the invention, comprising a graphics detection unit;

FIG. 2 schematically shows an embodiment of the image conversion unit comprising a two-dimensional lookup table;

FIG. 3 shows a number of transfer functions to be applied in the embodiment of FIG. 2;

FIG. 4 schematically shows another embodiment of the image conversion unit according to the invention;

FIG. 5 schematically shows an embodiment of the image processing apparatus according to the invention; and FIG. 6 shows an input image and an output image.

Same reference numerals are used to denote similar parts throughout the Figures.

FIG. 1A schematically shows an embodiment of the image conversion unit 100, according to the invention. The image conversion unit 100 is arranged to convert input images into output images. The input images are provided at the input connector 106 and the output images are outputted at the output connector 108. The image conversion unit 100 comprises:

a filter 102 for selecting groups of connected input pixels from the input images, and a pixel processor 104 for assigning luminance values to output pixels of the output images on basis of the respective luminance values of the input pixels of the input images, whereby the luminance values of the output pixels corresponding to the groups of connected input pixels are higher than the respective luminance values of the connected input pixels.

The groups of connected input pixels are characterized in that they have:

a size which is small relative to the size of the input image; and high luminance values relative to the range of input luminance values.

The filter 102 and the pixel processor 104 may be implemented using one processor. Normally, these functions are performed under control of a software program product. During execution, normally the software program product is loaded into a memory, like a RAM, and executed from there. The program may be loaded from a background memory, like a ROM, hard disk, or magnetical and/or optical storage, or may be loaded via a network like Internet. Optionally an application specific integrated circuit provides the disclosed functionality.

Preferably, the output of the filter 102 is not binary, but corresponds to a gain control signal with values in a range comprising more than two values. Preferably, for each pixel of the input image a corresponding gain value is determined to be applied for optionally adapting the corresponding luminance value. For instance a gain value which is higher than one results in an increase of the luminance value. A higher gain value results in a higher increase of the luminance value.

FIG. 1B schematically shows an embodiment of the image conversion unit 101 according to the invention, comprising an average luminance computing unit 110. Preferably, highlights are enhanced as much as possible however the average luminance value should not increase too much. The amount of enhancement does not have to be predetermined. That means that if the amount of available dynamic range is relatively high e.g. because of the average luminance value of the input image is relatively low, the amount of enhancement of bright areas may be relatively large. However, if the average luminance value of the input image is already relatively high, the amount of enhancement of bright areas is preferably limited. In the latter case, a compression of relatively low luminance values is typically required to create room for the increase of relatively high luminance values. Optionally a feedback mechanism is implemented to adjust the amount of enhancement to be applied, by means of comparing the input image and a test output image which is enhanced with a predetermined gain.

The average luminance-computing unit 110 is arranged to compute a sum by accumulating luminance values of the input image or of a portion of the input image. Subsequently, the sum is divided by the number of accumulated luminance values.

The output of the average luminance-computing unit 110, i.e. the average luminance value may be applied in several ways. Preferably, the average luminance value is applied to control the filter characteristics of the filter 102. The aperture of the filter kernel may be proportional to the average luminance value or a gain factor of the filter may be related to the average luminance value. Alternatively, (not depicted) the average image value is applied to control the pixel processor 104.

FIG. 1C schematically shows an embodiment of the image conversion unit 103 according to the invention, comprising a graphics detection unit 112. The aim of the image conversion unit 103 is to enhance the real image content, i.e. representing the scene being captured. However, in many cases graphics are superimposed, i.e. overlaid on the acquired/captured images. For instance subtitles are mixed with the acquired images. Another example is the presence of a logo of a broadcast station. Preferably, this type of graphic information is not enhanced, i.e. the luminance values of pixels representing this type of information are not increased. To prevent this enhancement from happening, an embodiment of the image conversion unit 103 comprises means to detect the presence of superimposed graphics. These means are known by the man skilled in the art. E.g. the following references describe methods for detection: U.S. Pat. No. 6,100,941, U.S. Patent application 20030091237 and the article "General and domain-specific techniques for detecting and recognized superimposed text in video", by D. Zhang, R, K. Rajendran, and S-F. Chang, Proc. IEEE ICIP (International Conference on Image Processing), Rochester, N.Y., USA, September 2002.

The output of the graphics detection unit 112 comprises a set of pixels which should be disregarded for increase of luminance value. Alternatively, the graphics detection unit 112 is arranged to provide a probability signal representing the probabilities that respective pixels correspond to graphics. The output of the graphics detection unit 112 may be applied in several ways. Preferably, the output is applied to control the filter. Alternatively, (not depicted) the output is applied to control the pixel processor 104.

FIG. 2 schematically shows an embodiment of the image conversion unit 200 comprising:

a high-pass filter 202 for indicating presence of bright detailed areas in the input image being provided to the high-pass via the input connector 106;

a gain control unit 204 for determining references to gain transfer functions depending on the output of the high-pass filter 202; and a pixel processor 104 being arranged to determine the output luminance value, to be provided to the output connector 108.

The working of the image conversion unit 200 is as follows. The high-pass filter 202 is arranged to compute a two-dimensional matrix M1 of values by high-pass filtering the input image. The two-dimensional matrix M1 has a number of elements which is equal to the number of pixels of the input image. The elements in the two-dimensional matrix corresponding to input pixels which have relatively high luminance values compared to the range of input luminance values and compared to neighboring input pixels have relatively high values too.

The gain control unit 204 is arranged to transfer the two-dimensional matrix M1 which is provided by the high-pass filter into a further two-dimensional matrix M2 comprising references to gain transfer functions. See the two-dimensional matrix in FIG. 6 indicated with reference number 604 as an example. See FIG. 3 for examples of gain transfer functions. The elements of the further two-dimensional matrix M2 represent the respective which gain transfer functions of the set of gain transfer functions which have to be applied to the corresponding input pixels of the input image.

The pixel processor 104 is provided with the luminance values of the input pixels of the input image and with the further two-dimensional matrix M2 of the gain control unit 204. The pixel processor 104 is arranged to apply the conversion of the input luminance value of the input pixel into the output luminance value of the output pixel by multiplying the input luminance value with a factor, i.e. gain value, which is based on the input luminance value and the output value of the appropriate gain transfer function for that input luminance value. Preferably, the output luminance values are determined by means of a two-dimensional lookup table having:

a first dimension of luminance values as input entries;

a second dimension of gain transfer functions as input entries; and luminance values as outputs.

FIG. 3 shows a number of transfer functions to be applied in the embodiment of FIG. 2. The x-axis corresponds with (normalized) input luminance values and the y-axis corresponds output luminance values. One of the gain transfer functions (Gain Transfer Function 1) corresponds with unity gain, resulting in no difference between input luminance value and output luminance value. Gain Transfer Function 4 corresponds with the highest gain values. Notice that for relatively low luminance values all gain transfer functions correspond with unity gain. That means that only relatively high luminance values are actually increased.

FIG. 4 schematically shows another embodiment of the image conversion unit 400 according to the invention, comprising:

a high-pass filter 202 for high-pass filtering the input image resulting in a two-dimensional matrix M3. The two-dimensional matrix M3 has a number of elements which is equal to the number of pixels of the input image. The elements in the two-dimensional matrix M3 corresponding to input pixels which have relatively high luminance values compared to neighboring input pixels have relatively high values.

a subtraction unit 402 for subtracting an offset value from the luminance values of the input image;

a clipping unit 404 for clipping all negative values of the output of the subtraction unit 402 to zero. The output of the clipping unit 404 is an intermediate image of which only pixels corresponding to input pixels of the input image with relatively high luminance values have luminance values which differ from zero;

a modulation unit 406 for modulating the output of the clipping unit with the output of the high-pass filter 202. The output of the modulation unit 406 is a two-dimensional matrix having the size of the input image. Typically, most of the elements of the two-dimensional matrix are substantially equal to zero, in particular the elements corresponding to input pixels having relatively low luminance values. Only, the elements of the two-dimensional matrix corresponding to input pixels having relatively high luminance values have luminance values higher than zero; and a combining unit 104 for adding the output of the modulation unit 406 to the respective input luminance values of the input pixels to compute the output luminance values of the output pixels, to be provided at the output connector 108.

The high-pass filter 202 may be arranged to filter a luminance signal directly. Alternatively, the high-pass filter 202 is arranged to filter different color components (RGB) separately and to combine the results of the different filtering operations.

FIG. 5 schematically shows an embodiment of the image processing apparatus 500 according to the invention. The image processing apparatus 500 comprises:

receiving means for receiving a signal representing input images;

an image conversion unit for converting the input images into output images, as described in any of the FIGS. 1A-C, 2-4; and an optional display device 506.

The signal may be a broadcast signal received via an antenna or cable but may also be a signal from a storage device like a VCR (Video Cassette Recorder) or Digital Versatile Disk (DVD). The signal is provided at the input connector 508. The image processing apparatus 500 might e.g. be a TV. Alternatively the image processing apparatus 500 does not comprise the optional display device 506 but provides the output images to an apparatus that does comprise a display device 506. Then the image processing apparatus 500 might be e.g. a set top box, a satellite-tuner, a VCR player, a DVD player or recorder. Optionally, the image processing apparatus 500 comprises storage means, like a hard disk or means for storage on removable media, e.g. optical disks. The image processing apparatus 500 might also be a system being applied by a film-studio or broadcaster.

FIG. 6 shows an input image 602 and the corresponding output image 606 to illustrate the method according to the invention. The average luminance value of the input image 602 and the average luminance value of the output image 606 are substantially mutually equal. The output luminance values of the highlights, e.g. from headlights, streetlights and reflections, are higher than the input luminance values of the input pixels representing the same objects. FIG. 6 also shows the output of the gain control unit 204 as described in connection with FIG. 2.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. An image conversion apparatus for converting an input image signal representing input images into an output image signal representing output images, comprising:

a filter, responsive to receiving the input image signal, having a kernel size of a first area of pixels for selecting a group of connected input pixels from an input image for luminance value increase, the group of connected input pixels (i) corresponding to a highlight of the input image having a brightness that is near a maximum of a dynamic range of the input image, (ii) having a size of limited dimensions which is relatively small relative to a size of the input image, and (iii) further having high luminance values relative to luminance values of neighboring pixels in a region of a second area of pixels, the second area of pixels being a little bigger than the first area of pixels; and a pixel processor, responsive to receiving the input image signal and an output of the filter, for assigning luminance values to output pixels of an output image on basis of the respective luminance values of the input pixels of the input image, wherein the pixel processor re-creates highlights of the input image as a visual appearance of sparkle by (i) selectively increasing luminance values of the selected group of connected input pixels corresponding to input image bright areas having limited dimensions which extend over less than a number of pixels in the kernel size of the filter and (ii) maintaining original luminance values of both (ii)(a) larger bright areas of the input image, except for the selected group of connected input pixels corresponding to input image bright areas having limited dimensions, and (ii)(b) dark areas of the input image to avoid a significant increase of average luminance of the output image over the input image.

2. The image conversion apparatus as claimed in claim 1, whereby the filter comprises a high-pass filter.

3. The image conversion apparatus as claimed in claim 1, further comprising:
a gain control unit for controlling the pixel processor by means of a gain control signal which is based on the luminance values of the input pixels.

4. The image conversion apparatus as claimed in claim 3, wherein the gain control signal is based on the output of the filter, wherein an actual gain value of the gain control signal is high for a high output value of the filter.

5. The image conversion apparatus as claimed in claim 4, wherein the pixel processor is arranged to determine a particular output luminance value of a particular output pixel (i) on basis of a particular input luminance value of a particular input pixel corresponding to the particular output pixel and (ii) on basis of a particular gain value for the particular input pixel.

6. The image conversion apparatus as claimed in claim 1 above, being arranged to convert the input pixels with luminance values in the range of input luminance values to respective output pixels with luminance values in a range of output luminance values, whereby the range of output luminance values is bigger than the range of input luminance values.

7. The image conversion apparatus as claimed in claim 1, being arranged to convert the input pixels with luminance values in the range of input luminance values to respective output pixels with luminance values in a range of output luminance values, wherein the range of output luminance values and the range of input luminance values are substantially equal.

8. The image conversion apparatus as claimed in claim 1, further comprising:
an average luminance computing unit for computing the average luminance value of the input image and for controlling the conversion of luminance values of input pixels into respective luminance values of output pixels.

9. An image processing apparatus, comprising:
receiving means for receiving an input image signal representing input images; and
an image conversion apparatus for converting the input image signal representing input images into an output image signal representing output images, as claimed in claim 1.

10. The image processing apparatus as claimed in claim 9, further comprising:
a display device for displaying the output images.

11. The image processing apparatus as claimed in claim 10, wherein the display device is based on any of the set of display technologies comprising LCD, OLED, PolyLED and RGBW.

12. A method of converting an input image signal representing input images into an output image signal representing output images, comprising:
selecting a group of connected input pixels having a kernel size of a first area of pixels from an input image of the input image signal for luminance value increase, the group of connected input pixels (i) corresponding to a highlight of the input image having a brightness that is near a maximum of a dynamic range of the input image, (ii) having a size of limited dimensions which is relatively small relative to a size of the input image, and (iii) further having high luminance values relative to luminance values of neighboring pixels in a region of a second area of pixels, the second area of pixels being a little bigger than the first area of pixels; and
assigning luminance values to output pixels of an output image on basis of the respective luminance values of the input pixels of the input image, wherein assigning comprises re-creating highlights of the input image as a visual appearance of sparkle by (i) selectively increasing luminance values of the selected group of connected input pixels corresponding to input image bright areas having limited dimensions which extend over less than a number of pixels in the kernel size and (ii) maintaining original luminance values of both (ii)(a) larger bright areas of the input image, except for the selected group of connected input pixels corresponding to input image bright areas having limited dimensions, and (ii)(b) dark areas of the input image to avoid a significant increase of average luminance of the output image over the input image.

13. A non-transitory computer readable medium embodied with a computer program to be loaded by a computer arrangement, comprising instructions to convert an input image signal representing input images into an output image signal representing output images, the computer arrangement comprising processing means and a memory, the computer readable medium, after being loaded, providing said processing means with the capability to carry out:
selecting a group of connected input pixels having a kernel size of a first area of pixels from an input image of the input image signal for luminance increase, the group of connected input pixels (i) corresponding to a highlight of the input image having a brightness that is near a maximum of a dynamic range of the input image, (ii) having a size of limited dimensions which is relatively small relative to a size of the input image, and (iii) further having high luminance values relative to a luminance values of neighboring pixels in a region of a second area of pixels, the second area of pixels being a little bigger than the first area of pixels; and
assigning luminance values to output pixels of an output image on basis of the respective luminance values of the input pixels of the input image, wherein assigning comprises re-creating highlights of the input image as a visual appearance of sparkle by (i) selectively increasing luminance values of the selected group of connected input pixels corresponding to input image bright areas having limited dimensions which extend over less than a number of pixels in the kernel size and (ii) maintaining original luminance values of both (ii)(a) larger bright areas of the input image, except for the selected group of connected input pixels corresponding to the input image bright areas having limited dimension, and (ii)(b) dark areas of the input image to avoid a significant increase of average luminance of the output image over the input image.

* * * * *